W. D. EWART,

Assignor to EWART MANUFACTURING CO.

DRIVE CHAIN.

No. 10,444. Reissued Feb. 5, 1884.

*Witnesses:*

J. Henry Kaiser.

A. L. Browne

*Inventor:*

W. D. Ewart

By att.

J. N. Mc. Intire

THE NORRIS PETERS CO., PHOTO-LITHO., WASHINGTON, D. C.

UNITED STATES PATENT OFFICE.

WILLIAM DANA EWART, OF CHICAGO, ILLINOIS, ASSIGNOR TO EWART MANUFACTURING COMPANY, OF SAME PLACE.

DRIVE-CHAIN.

SPECIFICATION forming part of Reissued Letters Patent No. 10,444, dated February 5, 1884.

Original No. 154,594, dated September 1, 1874; Reissue No. 6,387, dated April 20, 1875; Reissue No. 9,256, dated June 15, 1880.
Application for reissue filed August 22, 1883.

*To all whom it may concern:*

Be known that I, WILLIAM DANA EWART, formerly of Belle Plaine, in the county of Benton and State of Iowa, but now of Chicago, county of Cook, and State of Illinois, have invented a new and useful Improvement in Drive-Chains; and I do hereby declare that the following is a full, clear, and exact description of the same, reference being had to the annexed drawings, which make a part of the specification, and to the letters and figures of reference marked thereon.

Figure 1:
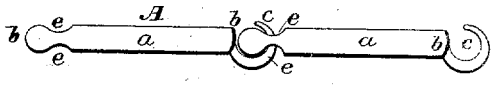
Figure 2:
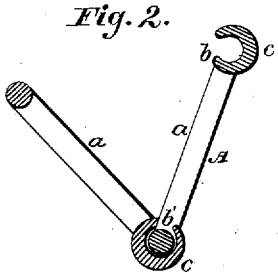
Figure 3:
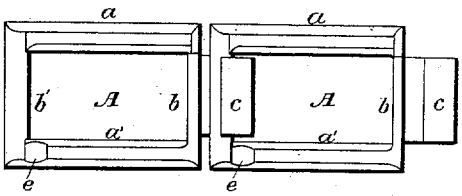
Figure 4:
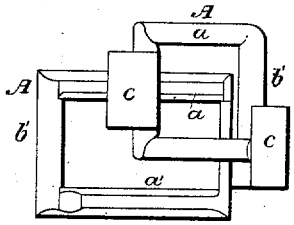

Figure 1 of the drawings represents a side view of my drive-chain. Fig. 2 is a sectional view of the same. Fig. 3 is a plan or top view of the same. Fig. 4 is a detailed view, showing a method of detaching the links of the chain.

This invention relates to what are called "rag-chains," which are used in combination with sprocket-wheels on harvesting or other machinery.

My invention consists in a drive-chain which is made up of detachable links, for the purpose of readily substituting new links for broken ones or changing the length of the chain, while at the same time the links are not liable to casual detachment, as hereinafter more fully described.

The following is a description of my invention. The links A are preferably of a rectangular form, longer than they are broad, their side bars, *a a'*, being round, or nearly so, and their end bars, *b b'*, being constructed as shown in the annexed drawings. The end bar *b* is made with a broad hook, *c*, which is about three-quarters of a circle, and which is adapted to the reception and working within it of the end bar *b'*. For the purpose of connecting the links to make a chain of them and disconnecting them readily, one of the side bars of each link is made sufficiently small near the end bar *b* to pass through the opening of the hook *c*, so that when two links are held at an angle, as shown in Figs. 2 and 4, they can be hooked together or unhooked. When the links are coupled, the hook of one link is received between the side bars of another link, and when the links are straightened, as shown in Figs. 1 and 3, they will not uncouple. The side bar *a'* is made sufficiently small at *e* to pass through the opening of the hook *c*.

Among many advantages attending my invention I will mention the following: The links are taken apart and put together without bending, riveting, or altering any part of them, and the fastening connecting them together is such as to admit of square or open links being fastened closely together, so that the sprockets on the driving-pulleys may be arranged near each other, thereby dividing the application of power and diminishing the strain. They allow the chains to be readily shortened and lengthened or repaired by inserting new links without bending any part of the fastenings, and the connections make the broadest possible bearings on each other, thereby preventing lateral motion of the chain when run slack, and increasing the strength.

What I claim as new, and desire to secure by Letters Patent, is—

1. The combination, in a drive-chain, of the coupling-hooks *c* and side bars sufficiently small close to the end bars to pass through the opening of the hook *c*, as shown and described.

2. The combination, in the open link of a drive-chain, of the end bar *b*, provided with a coupling-hook, and an opposite end of the link adapted to be coupled to the hook of a correspondingly-constructed link, to form a chain, substantially as set forth.

WILLIAM DANA EWART.

Witnesses:
JACOB FELBEL,
M. H. SMITH.